United States Patent

Sherman

[11] Patent Number: 4,648,201
[45] Date of Patent: Mar. 10, 1987

[54] ELONGATED BAFFLED TUNNEL OPENING FOR A RODENT TAMPER-RESISTANT BAIT STATION

[76] Inventor: Daniel A. Sherman, 1355 Bobolink Pl., Los Angeles, Calif. 90069

[21] Appl. No.: 840,066

[22] Filed: Mar. 17, 1986

[51] Int. Cl.⁴ ............................................. A01M 1/20
[52] U.S. Cl. .................................................. 43/131
[58] Field of Search ............................. 43/58, 98, 131

[56] References Cited

U.S. PATENT DOCUMENTS

| | | | |
|---|---|---|---|
| 1,352,067 | 9/1920 | Keyser | 43/131 |
| 3,466,789 | 9/1969 | Kare | 43/131 |
| 4,132,026 | 1/1979 | Dodds | 43/131 |
| 4,205,480 | 6/1980 | Gartner | 43/98 |
| 4,349,981 | 9/1982 | Sherman | 43/131 |
| 4,541,198 | 9/1985 | Sherman | 43/131 |
| 4,550,525 | 11/1985 | Baker et al. | 43/131 |
| 4,570,377 | 2/1986 | Primavera | 43/131 |

*Primary Examiner*—M. Jordan

[57] ABSTRACT

A tamper-resistant rodent bait station having baffles on the tunnel entrance. The tunnels having longitudinal sections removed directly opposite the directly adjacent the baffles that elongates the distance between each opposing wall opening on each side and each respective baffle to allow a larger rodent to enter which allows for minimizing the diameter of the tunnel.

9 Claims, 8 Drawing Figures

ELONGATED BAFFLED TUNNEL OPENING FOR A RODENT TAMPER-RESISTANT BAIT STATION

BACKGROUND OF THE INVENTION

Rodents have been a source of disease, competed for food and in general have been considered a pest to mankind since the beginning of recorded time.

Many methods of eliminating these creature have been put forward but the most effective method of large scale reduction of rodent populations remains the use of poisoned materials that they either consume as a food source, or walking through them, pick up on their feet and then consume as they groom themselves.

The danger to non-target species, humans, domestic animals, pets, and food sources is based upon the fact that most poisoned baits contain food sources that are attractive not only to the creature which are intended to be destroyed, but also to those which are of value or in fact, to humans themselves.

These use of poisoned tracking powders, while highly effective, represent the same type of inherent danger in that they can spread or be touched by animals and humans without their knowledge.

Therefore, a system must be provided that will inhibit the contact of these non-target species from the poisons used for rodent eradication while providing a device that will allow ease of access to the target vector.

In the past patents have been granted to several such devices as indicated in U.S. Pat. Nos. 4,132,026 1/1979 Dodds . . . 43/131; 4,161,079 7/1979 Hill . . . 43/131; 4,281,471 8/1981 Jenkins et al . . . 43/131; 4,349,981 9/1982 Sherman . . . 43/131; 4,031,653 6/1977 Jordan . . . 43/131; 4,161,079 7/1979 Hill . . . 43/131; 4,349,982 9/1982 Sherman . . . 43/131; 4,400,904 8/1983 Baker . . . 43/131; 4,541,198 9/1985 Sherman . . . 43/131; Foreign Pat. Nos. 6617388 5/1968 Netherlands . . . 43/131; 2111022 9/1972 Federal Republic of Germany . . . 43/131.

These devices, while providing some protection to the poisoned baits, are defective in many respects because they are bulky to carry and store, allow spillage of poisoned baits, require large areas to position themselves in, present a potential hazard in many cases to children, pets and domestic animals and, are very costly to construct.

In general, while advancing the state of the art, in many cases the inventions cited previously cannot be effectively used and will not fully protect the environment from contamination of the poisoned materials.

An object of the present art is to improve on these devices, specifically on the SHERMAN U.S. Pat. No. 4,349,981 by providing a version that can be easily stored, provides tamper-resistant entrance and egress for the target species and, will inhibit contact of the poisoned materials by children, pets, etc.

A further object of the invention is to provide and environment that a rodent such as a house mouse, will feel inviting and comfortable in entering and feeding in.

A further object of the invention is to provide a device that can be assembled by the user as needed and loaded with either rodenticide baits or be used with poisoned tracking powders while isolating these toxins from unauthorized tampering.

A further object of the invention is to provide "line of sight" enterance and egress to the target rodent while establishing a system of baffles at the entrance tunnels that will not allow the contact of prying fingers to the poisoned baits or powders.

Still another object of the invention is to allow the bait station to be secured to a floor or wall surface in order to prevent movement of the station and possible spillage of its contents.

Another object of the instant invention is to provide a secure method of assembling the bait station into a finished form with the use of a positive latching system.

Still another object of the invention is to provide a tray running the length of the bait station that will hold tracking powders in place.

Yet another object of the instant invention to to provide an entrance tunnel, baffled in such a manner, that it will require a "setback" in the construction of the tunnel structure both on the exterior and interior portions in order to provide the minimum amount of space needed for the rodent to traverse to bait station and thereby further inhibit prying fingers and other object that might be forced into contact with the poison.

Still another object of the invention is to provide opposing baffles on the tunnel structures that will allow a rodents fluid body to easily traverse the tunnel structure but will deflect any attempt by objects such as fingers from reaching the contents of the baiter.

A further object of the invention is to provide a center mounting stake that can be used to hold a bait block far enough away from the tunnel structures that the bait will not be reached or moved if the baiter is tipped over.

And finally, the invention provides for separate structures that can be secured together without the use of any external means such as ties, nuts or bolts but, rather will clip together to form an integrated structure that is tamper-resistant, re-usable and totally secure.

With the introduction of more powerful toxins for the control of rodent populations and, with the need for large scale use of these toxins to defeat rodent populations that have become resistant to safer rodenticides, it has become necessary to provide a low cost, compact device that will safely contain these baits and powders.

This invention meets these criterias and other objects, advantages and novel features of the invention will become apparent when considered with the following description and in conjunction with the accompanying drawings.

DETAILED DESCRIPTION OF THE PREFERRED EMBODIMENT

Figure 1:
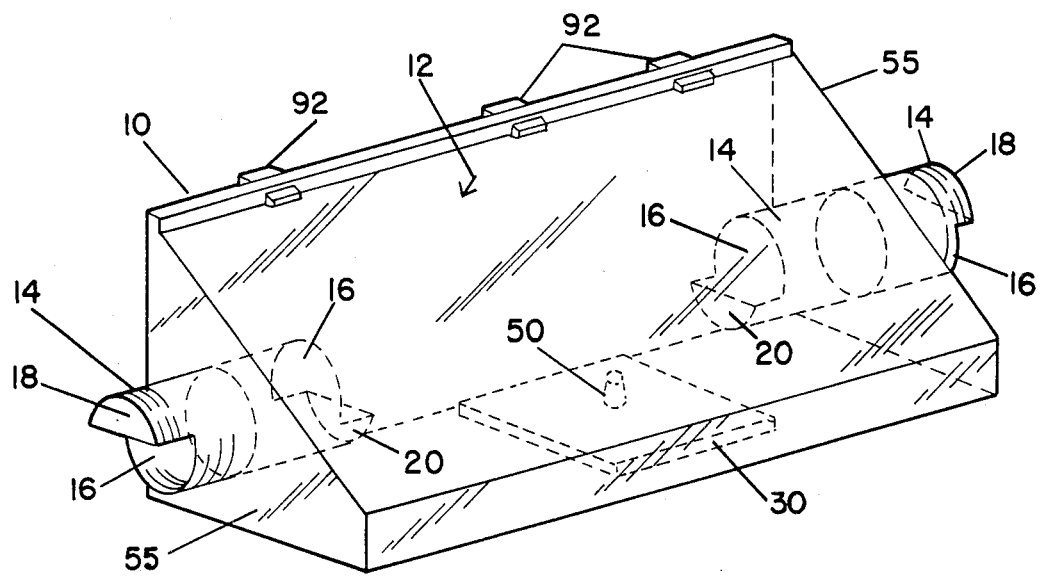
FIG. 1 shows the total configuration of the bait station when set up with its ends in place. Demonstrated in this drawing are the right angle shape of the bait station that positions it directly against a wall, the use of a series of locking holes and tabs to clip the unit together at the top, the tunnel structures protruding through the walls of the bait station in direct line with each other, the baffeling system that provides primary security for the tunnels and the opposing baffles at the high and low ends of the tunnel structure that, while allowing the rodent to traverse the tunnel will inhibit direct probing by univited objects. Also depicted are the set backs that increase the overall opening dimension of the tunnel structures while utilizing a minimum dimension for the internal diameter of the tunnel itself. Shown in addition is the use of a center peg to hold a bait block in place and to prevent its movement.

As can be seen by reference to FIG. 1 the Rodenticide Tamper-Resistant bait Station is constructed generally as 12 with side members 55 that contain tunnel structures 14 to form the total unit.

The main structure of said bait station 55 contains locking tabs 92 that cooperate with holes in the upper portion 12 to form a right angle when fitted together.

Figure 2:
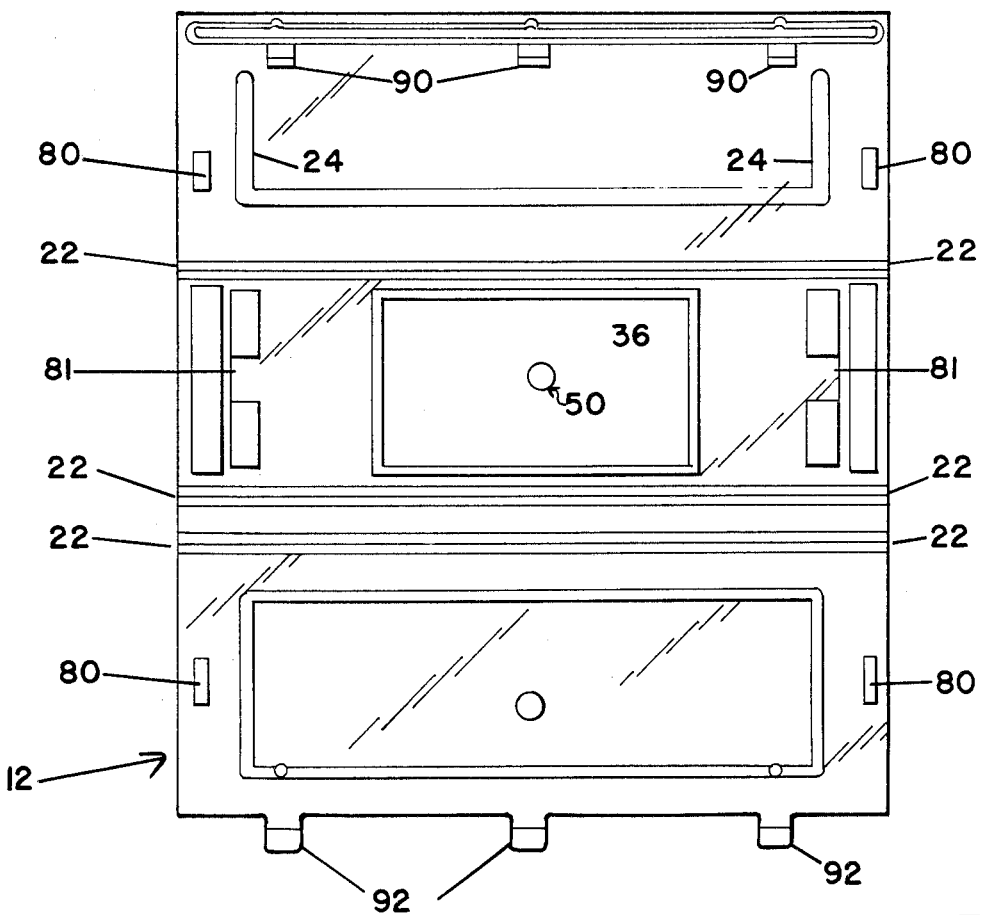
FIG. 2 is a top view of the knocked down structure without the sides in place. Depicted are the tabs and holes for locking the unit together, the center tray to hold powders in place, a series of recesses that allow the sides to clip into the set up structure after the tabs have been installed in the locking holes, the center post, a series of parallel grooves running the length of the structure that allow the baiter to fold into the desired position for set up and various bosses used to reinforce the structure of the bait station after set up.

Tunnels 14 pass through walls 55 to form an elongated entrance and egress hole that is parallel with the wall and directs the rodent along a center pathway to come in contact with bait 30 contained on peg 50 or tracking powder contained in tray 36 as shown in FIG. 2. The front of the tunnel 14 contains a primary baffle at its top 18 and a set back 16 in its contruction. As you progress directly through the tunnel 14 you encounter a secondary baffle 20 also contructed with a traversing set back 16 in the interior of the tunnel structure.

In FIG. 2 we see the holes in the main structure 12 depicted as 90 that cooperate with tabs 92 in forming the set up bait station. Tray 36 is shown in the center portion of the drawing and is used to hold loose tracking powder or to allow a bait block 30 as in FIG. 1 to be set over peg 50.

Figure 6:
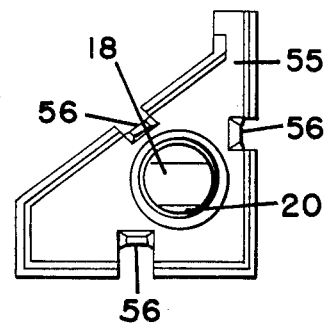
FIG. 6 is a side view of the side structure showing the relationship of the tunnels to the body of the side, a series of clips that allow the side to be secured to the main structure of the baiter, the relationship of the baffles in the tunnels to each other which allow the line of sight and the configuration of the side that conforms to the set up of the main body of the baiter allowing for a tight tamper-resistant fit.
Figure 7:
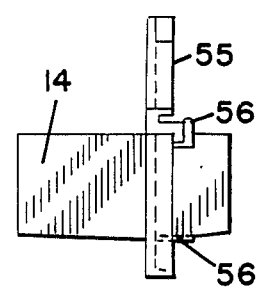
FIG. 7 is a top view of the side showing the relationship of the tunnels to the walls of the sides and the clips that hold them in place.
Figure 8:
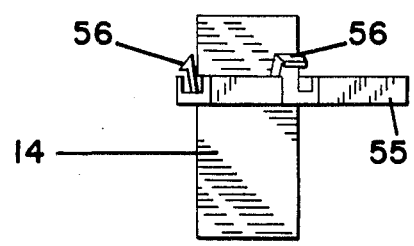
FIG. 8 is a detail of the side perspective of the side wall that demonstrates the additional clips and the relationship of tunnel to wall structure and the method of clipping the sides into the main baiter structure.

Reinforcing bosses 24 are used to stiffen the structure and provide a rigid back plate when the bait station is set up. Locking recesses are provided by 80 which cooperate with side structure tabs 56 as depicted in FIGS. 6,7,8 to form the totally enclosed structure with 81 representing the recess to the lowest locking tab as depicted in FIG. 6.

Figure 3:
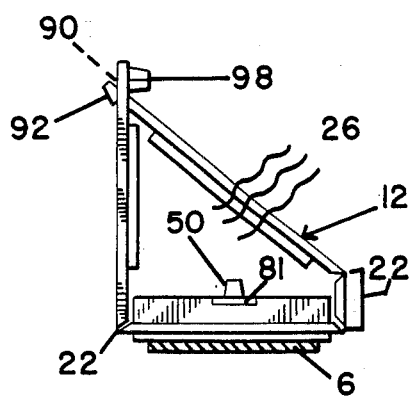
FIG. 3 is a side view of the bait station without the sides in place that demonstrates its translucent quality, shows the relationship of the holes and locking tabs, demostrates the positioning of the tape used to hold the bait station in place, depicts the right angle construction of the baiter that allows it to fit into tight spaces with the lowest profile, depicts the tray structure at the bottom of the baiter, show the low front rise of the baiter to allow space for the internal tray and shows the center peg protruding from the base of the unit.

Vertical scorings running the length of the main body 12 and designated as 22 allow for the unit to fold into the right angle configuration with the front rise to accommadate tray 36. In FIG. 3 we can see the relationship between the holes 90 and the tabs 92 which pass through the holes 90 and form a tight lock. Depicted in FIG. 3 is a lip 98 that runs the length of 12 and prevents water from running into the interior of 12 possibly ruining the powder contained in tray 36 or coming in contact with the bait 30 positioned on peg 50. Shown in FIG. 3 is the double sided tape 6 that holds 12 in place and prevent movement of the baiter. Also depicted is recess 81 that holds the bottom of the side structure 55 partially in place.

Figure 4:
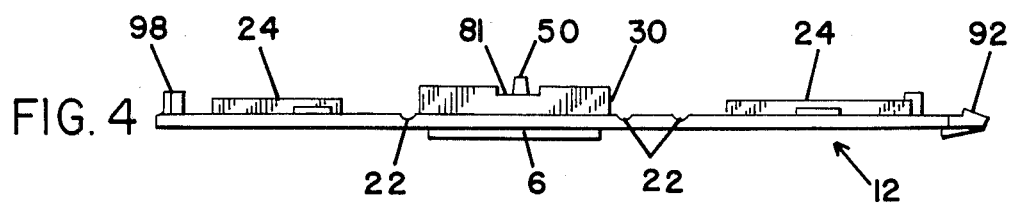
FIG. 4 shows the bait station unassembled.

In FIG. 4 we see the perspective of the tray in flat open form from a side view with 98 at the extreme left, reinforcing boss 24 followed by initial scoring 22 tray 36, followed by double scoring 22, additional stiffener 24 and locking tab 92.

Figure 5:
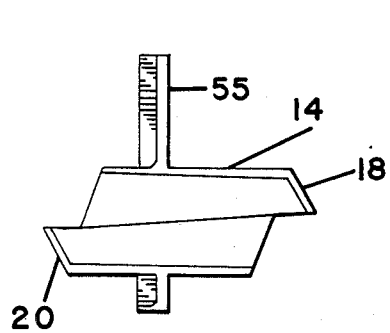
FIG. 5 is a profile of the right side of the baiter that depicts the relationship between the baiter walls and the tunnel structure that pierces these wall to provide the primary method of egress and entrance for the rodent. Shown clearly are the system of baffles at the front top of the tunnel structure and at the lower rear portion of said structure. Depicted also is the set back from the tunnels front and rear that elongates the actual passageway at the mouth of each entrance and egress hole. Line of sight is depicted by the differences in the levels of the front and rear baffles that allow a straight through line of vision under the front baffle and over the rear baffle.

FIG. 5 represents a detail of the side wall 55 showing the tunnel structure 14 and the intital baffle 18 with secondary baffle 20. The side perspective of these baffles is demonstrated in FIG. 6 showing the relationship of side wall 55, the tunnel 14 and the interior of the tunnels with their respective baffles 18 and 20. Also depicted are the clips 56. Said clips located at the left and right of the upright wall 55 cooperate with the locking recesses 80 located in the main body 12 and the bottom clip 56 depicted in FIG. 6 cooperates with recess 81 in the main body 12.

In FIG. 7 we see how, when the clip are positioned to cooperate with their recess on the main body of the baiter 12 that a postion of the tunnel 14 is inside the main body 14 and a portion is outside with wall 55 acting as the demarcation of said division.

FIG. 8 show another perspective of the clips 56 and also demonstrates the shape of clip 55 which is hooked at its end to mesh tightly with the recesses 81 and 80. Also depicted in FIG. 3 is the passage of light 26 through the baiter to allow a translucent effect in the baiters interior.

What I claim is:

1. A tamper-resistant rodenticide bait station having a single enclosed compartment that runs parallel with a building wall and is generally constructed as a right angle; said bait station having closed ends with a tunnel structure at each end; said tunnel structure having two baffles, a primary baffle located at an exterior portion of the tunnel structure and a second baffle located on the opposite end and on an interior portion of said tunnel structure; said tunnel being parallel with the compartment; and said tunnel structure having longitudinal sections removed directly opposite and directly adjacent the said baffles that elongates the distance between each opposing wall opening on each side and each respective baffle to allow a larger rodent to enter which allows for minimizing the diameter of the tunnel.

2. A tamper-resistant rodenticide bait station as in claim 1 whose base contains a tray for the collection of poisoned tracking powder.

3. A tamper-resistant rodenticide bait station as in claim 2 whose base contains a peg for the holding of a rodenticide bait block.

4. A tamper-resistant rodenticide bait station as in claim 3 that can be constructed of modular diverse components to form the total unit.

5. A tamper-resistant rodenticide bait station as in claim 4 whose base contains double sided tape to hold it in place.

6. A tamper-resistant rodenticide bait station as in claim 5 whose sides contain a series of clips that cooperate with its main structure to form a totally integrated and sealed unit.

7. A tamper-resistant rodenticide bait station as in claim 6 whose main structure contains locking tabs and holes that cooperate to form the total unit when placed through each other.

8. A tamper-resistant rodenticide bait station as in claim 7 that contains a shield running the length of the baiter to prevent moisture from entering the structure.

9. A tamper-resistant rodenticide bait station as in claim 8 made of a material that allows light to pass through it.

* * * * *